June 20, 1950          C. W. SPEARS          2,512,181
COLOR HARMONIZING CHART
Filed Nov. 19, 1945
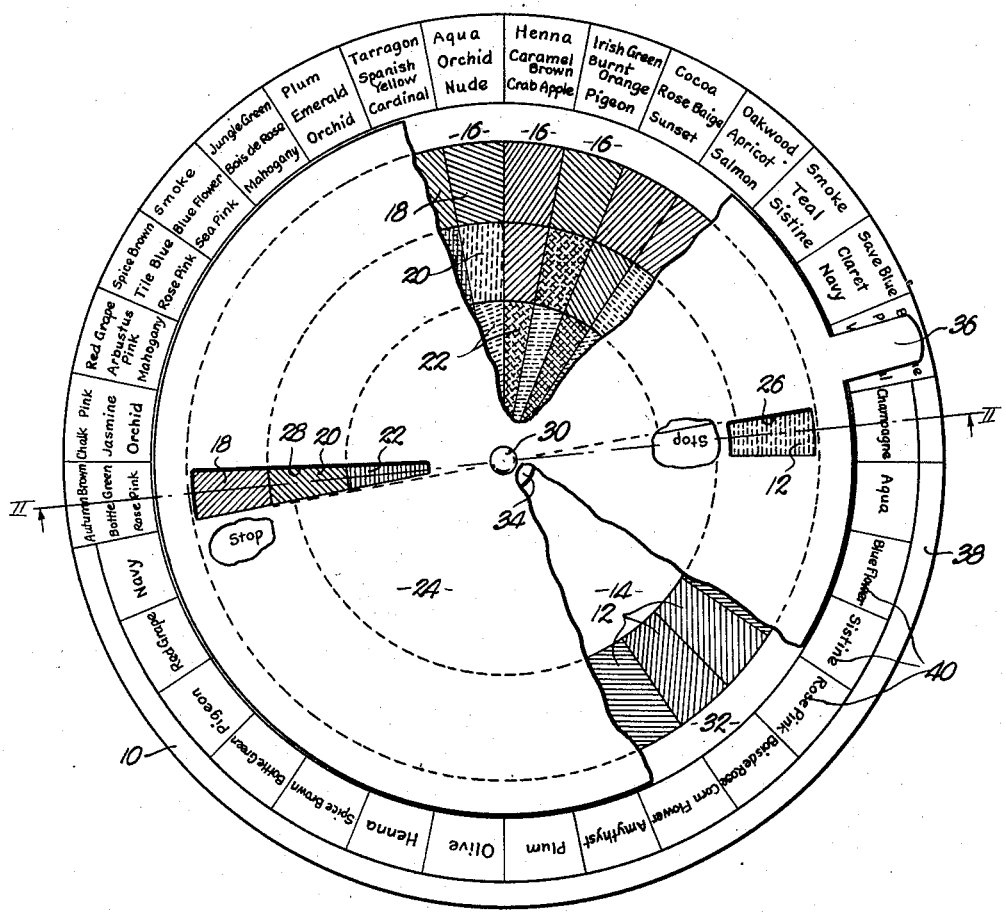
Fig. 1.
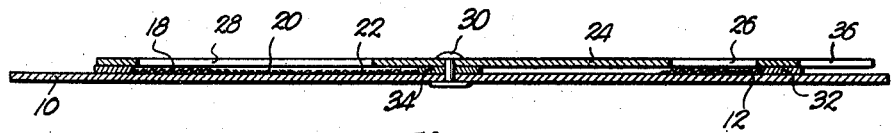
Fig. 2.
INVENTOR.
Charleszine Wood Spears
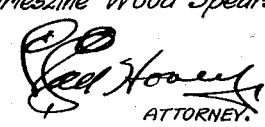
ATTORNEY.

Patented June 20, 1950

2,512,181

UNITED STATES PATENT OFFICE 2,512,181

COLOR HARMONIZING CHART

Charleszine Wood Spears, Kansas City, Kans.

Application November 19, 1945, Serial No. 629,339

3 Claims. (Cl. 35—28.3)

This invention pertains to the matching of colors and particularly to means for selecting appropriate and harmonious colors when a basic shade is known or being considered.

One of the important objects of this invention is to provide means for harmonizing colors when accessories are being chosen for use with garments or costumes having a predominating shade with which the accessories should harmonize.

This invention has for an even further object the provision of means for harmonizing colors that is easy to manipulate, understandable, and fully explanatory to the end that a person may quickly determine the character of trimmings or accessories that are to be associated with a costume of a particular shade.

Still further objects of the invention are to provide compact means for supporting a group of swatches of colored materials and a plurality of series of swatches of colored materials in such relationship that a part of the supporting means may be manually manipulated to indicate a particular series of swatches when one of the swatches of the said group is used as a guide; to provide a chart for supporting the aforesaid swatches; and to provide structure constituting the chart that will allow quick determination and solution of the color harmonizing problem at hand.

Other objects of the invention will appear during the course of the following specification referring to the accompanying drawing; wherein:

Fig. 1 is a plan view of a color matching chart made in accordance with the present invention, parts being broken away for clearness of illustration, and Fig. 2 is a sectional view through the chart shown in Fig. 1 taken on line II—II thereof.

The chart chosen for illustration comprises a base member 10 upon which is mounted a group of swatches 12 arranged in successive arcuate alignment to provide a group of swatches 12 of colored materials, which group is broadly designated by the numeral 14. A plurality of series of swatches of colored material is supported by base member 10 and these series 16 each include a swatch 18, a swatch 20 and a third swatch 22. The group of series of swatches 16 is in an arcuate path in continuation of group 12 and so diametrically opposed that the shiftable shutter 24 will reveal appropriate related swatches 18, 20 and 22 of one of the series 16 when a swatch 12 of group 14 is brought to view through window 26 formed in shutter 24. The swatches 18, 20 and 22 of the series 16 thereof, are brought into the view of the operator through aperture 28 formed in shutter 24 and the size of aperture 28 is such as to reveal substantially all of the swatches lying in register therewith.

Shutter 24 is pivotally carried by base member 10 through the medium of a pivot pin 30 formed and disclosed as clearly illustrated in Fig. 2. A track having outer and inner stretches 32 and 34 respectively, which stretches serve as spacers between base member 10 and shutter 24, and the thickness of these track stretches 32 and 34 is greater than the thickness of any of the swatches comprising group 14 or series 16; therefore, shutter 24 does not drag over the upper faces of any of the swatches. A handle 36 extending radially from the annular edge of shutter 24 provides an easy grip for the operator and this handle lies over an annular marginal edge 38 on base member 10, which margin is defined by the outer edge of shutter 24 and the annular edge of member 10. Margin 38 carries indicia 40 indicative of color of the swatch or swatches, as the case may be, in radial alignment with the name or indicating designation thereof. For example, indicia 40 (rose pink) is in opposed relation with swatch of material 12 in group 14 which is of that particular shade. The indicia 40 reading (Irish green), (Burnt orange) and (pigeon) are in radial alignment with swatches of material 18, 20 and 22 respectively in series 16 adjacent to said quoted indicia. As a further example, and referring to the setting of the chart as it appears in Fig. 1, swatch 12 exposed to view through window 26 is champagne color while swatches 18, 20 and 22 exposed through aperture 28 are autumn brown, bottle green and rose pink. These last three mentioned colors compare in line, saturation and brilliance with the color of swatch 12 in group 14 and therefore, if the user of the chart has the problem of providing accessories or secondary items that properly blend with the color champagne, then such accessories or items should be of one or all of the three colors appearing at aperture 28.

A practical illustration is possible when the chart is used as means for selecting dress accessories or trimmings. The color of the dress or suit is the same as one of swatches 12 in group 14 and the color of the accessories or trimming should be the same as the color of swatches 18, 20 or 22.

In commercial practice the color matching charts are prepared for blondes, brunettes, red heads or other types and the swatches 12 in group 14 are specially selected with regard to the shade that each of said types should wear. In other words, there is a chart for blondes, a chart for brunettes and a chart for red heads, olive skin, brown skin and dark brown skins. On these respective charts are gathered swatches 12, showing colors that each of these types should wear. With each swatch 12 a series of swatches 18, 20 and 22 are selected for each base color, whereupon the exact group of materials may be obtained and worn by any person. This chart is usable not only for the selection of clothing materials, but for the selection of house furnishings, decorations and other articles.

The operation of the chart is simple and quite obvious from the foregoing specification and it will be apparent that window 26 moves through a path of travel extending through 180 degrees, whereupon the word "Stop" is shown through the window and the direction of travel is reversed. Window 12 and aperture 28 are shown to be diametrically opposite but if necessity dictates, these openings may be differently positioned so long as harmonizing colors in series 16 are presented to view when a particular base color in group 14 is beneath window 26.

Having thus described the invention, what I claim as new and desire to secure by Letters Patent is:

1. A chart for displaying harmonious colors comprising a base member; a group of swatches of colored materials in arcuate, side-by-side arrangement on one face of the base member and concentric with the center thereof; a plurality of series of swatches of colored material on said one face of the base member, said series of swatches being arranged in an arcuate concentric path in opposed relation to the said group of swatches, the swatches of each series being in color harmony with the swatch of said group diametrically opposite thereto; a shutter provided with a window and an aperture, said shutter being rotatable carried by the base member in overlying relation to said swatches, said window being of a size substantially equal to the area of each swatch of the group thereof, the aperture being of a size to present a view of an entire series of swatches of colored material, said window and said aperture being disposed on a line through said center of the base member and on opposite sides thereof; and means interposed between the base member and the shutter for holding the latter clear of the swatches as the shutter is rotated.

2. chart for displaying harmonious colors comprising a base member; a group of swatches of colored materials in arcuate, side-by-side arrangement on one face of the base member and concentric with the center thereof; a plurality of series of swatches of colored material on said one face of the base member, said series of swatches being arranged in an arcuate concentric path in opposed relation to the said group of swatches, the swatches of each series being in color harmony with the swatch of said group diametrically opposite thereto; a shiftable shutter provided with a window and an aperture carried by the base member in overlying relation to said swatches, said window being of a size substantially equal to the area of each swatch of the group thereof, the aperture being of a size to present a view of an entire series of swatches of colored material, said window and said aperture being disposed on a line through said center of the base member and on opposite sides thereof; and indicia on said one face of the base member identifying by name the colors of all swatches, said indicia being arranged in a circle circumscribing the periphery of the shutter.

3. A chart for displaying harmonious colors comprising a base member; a group of swatches of colored materials in arcuate, side-by-side arrangement on one face of the base member and concentric with the center thereof; a plurality of series of swatches of colored material on said one face of the base member, said series of swatches being arranged in an arcuate concentric path in opposed relation to the said group of swatches, the swatches of each series being in color harmony with the swatch of said group diametrically opposite thereto; a shiftable shutter provided with a window and an aperture carried by the base member in overlying relation to said swatches, said window being of a size substantially equal to the area of each swatch of the group thereof, the aperture being of a size to present a view of an entire series of swatches of colored material, said window and said aperture being disposed on a line through said center of the base member and on opposite sides thereof; and indicia on said one face of the base member identifying the colors of all swatches, said indicia being arranged in a circular path, said path being disposed radially outwardly from said shutter and from all of said swatches, said shutter having an actuating handle extending outwardly from the periphery thereof and offset from said line.

CHARLESZINE WOOD SPEARS.

REFERENCES CITED

The following references are of record in the file of this patent:

UNITED STATES PATENTS

| Number | Name | Date |
| --- | --- | --- |
| 1,329,896 | Frome | Feb. 3, 1920 |
| 1,351,661 | Kaufman | Aug. 31, 1920 |
| 1,515,512 | Mitchell | Nov. 11, 1924 |
| 1,629,330 | Adler | May 17, 1927 |
| 1,636,991 | Fuegelein | July 26, 1927 |
| 1,718,919 | Fitzgibbons | June 25, 1929 |
| 1,832,750 | Stephens | Nov. 17, 1931 |
| 1,960,669 | Freedman | May 29, 1934 |
| 1,964,260 | Jones | June 26, 1934 |
| 2,221,774 | Bowser | Nov. 19, 1940 |